(12) United States Patent
Kaufman et al.

(10) Patent No.: US 12,040,939 B2
(45) Date of Patent: *Jul. 16, 2024

(54) CONFIGURATION TECHNIQUES FOR MANAGED HOST OPERATING SYSTEMS AND CONTAINERIZED APPLICATIONS INSTANTIATED THEREBY

(71) Applicant: Microsoft Technology Licensing, LLC, Redmond, WA (US)

(72) Inventors: Peter J. Kaufman, Sammamish, WA (US); Shayak Lahiri, Redmond, WA (US); Yi Zhao, Medina, WA (US); Go Komatsu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,535

(22) Filed: Mar. 29, 2023

(65) Prior Publication Data

US 2023/0239199 A1 Jul. 27, 2023

Related U.S. Application Data

(63) Continuation of application No. 16/878,072, filed on May 19, 2020, now Pat. No. 11,632,294.

(51) Int. Cl.
*H04L 41/08* (2022.01)
*H04L 9/40* (2022.01)
(Continued)

(52) U.S. Cl.
CPC .......... *H04L 41/08* (2013.01); *H04L 41/0816* (2013.01); *H04L 41/0843* (2013.01); *H04L 63/20* (2013.01); *H04L 41/0893* (2013.01)

(58) Field of Classification Search
CPC . H04L 41/0816; H04L 41/0893; H04L 63/20; H04L 41/0843
See application file for complete search history.

(56) References Cited

U.S. PATENT DOCUMENTS 11,184,404 B1 * 11/2021 Hatch .................. H04L 63/205
2016/0026819 A1 * 1/2016 Malik ................ G06F 21/6218
726/1

(Continued)

OTHER PUBLICATIONS

Communication 94(3) Received for European Application No. 21716036.5, (Ms# 408355-EP01-PCT) mailed on Apr. 26, 2024, 7 pages.

*Primary Examiner* — Tonia L Dollinger
*Assistant Examiner* — Joseph M Cousins

(57) ABSTRACT

Embodiments described herein are directed to configuring managed computing devices utilizing containerized applications. For instance, a mobile device manager may provide configuration settings to a computing device via, for example, an enterprise network. A host operating system (OS) executing on the computing device determines and applies the settings that are applicable to the host OS. The configuration settings are stored for configuring containerized applications executing on the computing device. For instance, as new containerized applications are launched by the host OS, the containerized applications retrieve the configuration settings and determine and apply the settings that are applicable to the containerized applications. Results of applying the configuration settings to the host OS and the containerized applications are merged and sent to the mobile device manager. The host OS and the containerized application may, for example, implement the settings in order to be compliant with an enterprise's policy.

20 Claims, 8 Drawing Sheets

(51) Int. Cl.
*H04L 41/0816* (2022.01)
*H04L 41/084* (2022.01)
*H04L 41/0893* (2022.01)

(56) References Cited

U.S. PATENT DOCUMENTS

| | | | |
|---|---|---|---|
| 2018/0007556 A1* | 1/2018 | Lu | G06F 21/53 |
| 2018/0060059 A1* | 3/2018 | Wang | G06F 9/45558 |
| 2018/0139241 A1* | 5/2018 | Jacobsen | H04L 63/14 |
| 2018/0234459 A1* | 8/2018 | Kung | H04L 63/0263 |
| 2020/0092374 A1* | 3/2020 | Mehta | G06F 11/0793 |

* cited by examiner

CONFIGURATION TECHNIQUES FOR MANAGED HOST OPERATING SYSTEMS AND CONTAINERIZED APPLICATIONS INSTANTIATED THEREBY

CROSS-REFERENCE TO RELATED APPLICATIONS

This application is a Continuation Application of U.S. patent application Ser. No. 16/878,072 filed May 19, 2020, entitled "Configuration Techniques for Managed Host Operating Systems and Containerized Applications Instantiated thereby," which is incorporated herein by reference in its entirety.

BACKGROUND

Mobile device management (MDM) is one way to ensure employees stay productive and do not breach corporate policies. Many organizations control activities of their employees using MDM products/services and/or other management entities. Such products, services and/or entities primarily deal with corporate data segregation, securing emails, securing corporate documents on devices, enforcing corporate policies, and integrating and managing mobile devices, including laptops and handhelds of various categories. Such techniques reduce various security risks by ensuring that both computing devices issued by the organization and third-party computing devices that are allowed into the organization's network are configured in accordance with the organization's data and security policies.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to configuring managed computing devices utilizing containerized applications. For instance, a mobile device manager at a server may provide configuration settings to a computing device via, for example, an enterprise network. A host operating system executing on the computing device determines and applies the settings that are applicable to the host operating system. The configuration settings are stored for configuring containerized applications executing on the computing device. For instance, as new containerized applications are launched by the host operating system, the containerized applications retrieve the configuration settings and determine and apply the settings that are applicable to the containerized applications. The results of applying the configuration settings to the host operating system and the containerized applications are merged and sent to the mobile device manager. The host operating system and the containerized application may, for example, implement the settings in order to be compliant with an enterprise's policy (e.g., a data and/or security policy).

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
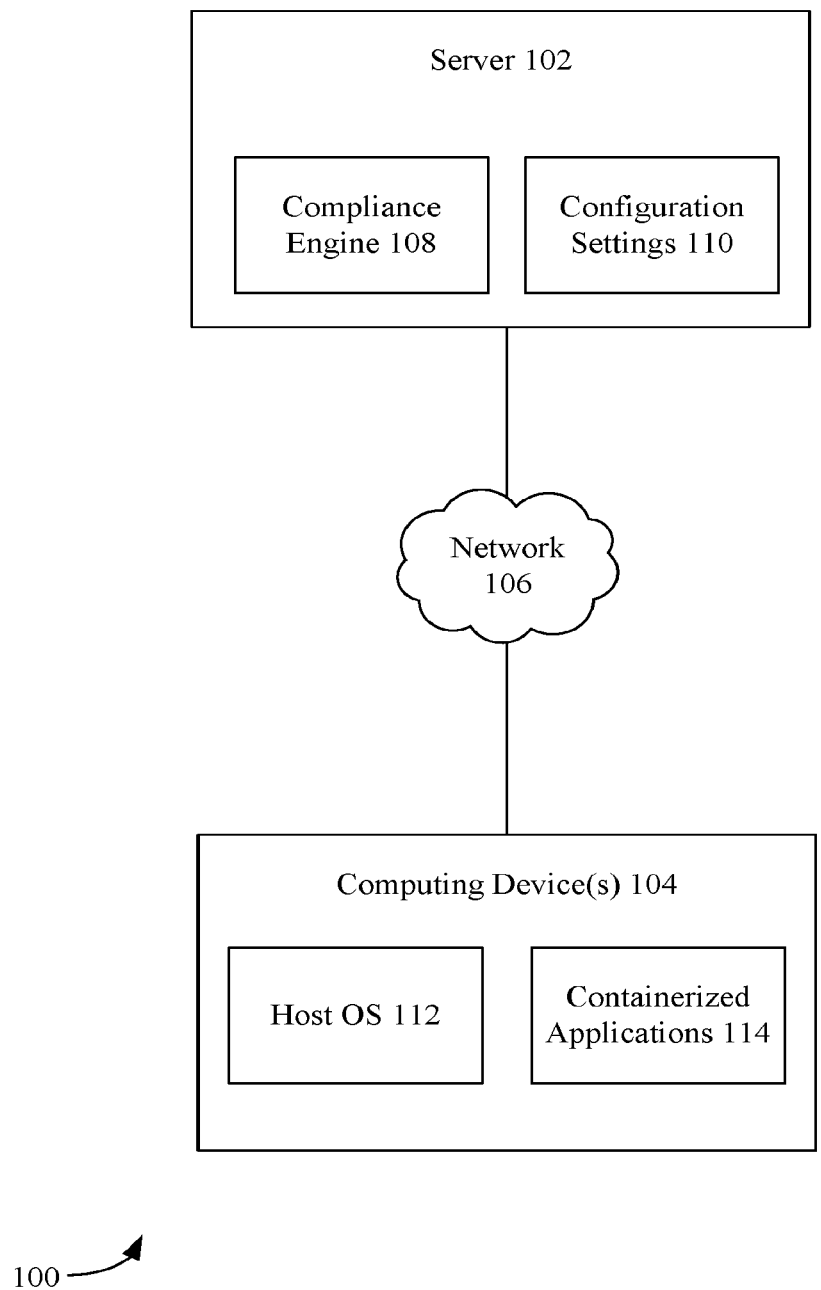
FIG. 1 depicts a block diagram of a system for managing and configuring one or more computing devices in accordance with an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. System and Method for Configuring Managed Computing Devices Utilizing Containerized Applications Embodiments described herein are directed to configuring managed computing devices utilizing containerized applications. For instance, a mobile device manager at a server may provide configuration settings to a computing device via, for example, an enterprise network. A host operating system executing on the computing device determines and applies the settings that are applicable to the host operating system. The configuration settings are stored for configuring containerized applications executing on the computing device. For instance, as new containerized applications are launched by the host operating system, the containerized applications retrieve the configuration settings and determine and apply the settings that are applicable to the containerized applications. The results of applying the configuration settings to the host operating system and the containerized applications are merged and sent to the mobile device manager. The host operating system and the containerized application may, for example, implement the settings in order to be compliant with an enterprise's policy (e.g., a data and/or security policy).

Instead of obtaining the configuration settings directly from the mobile device manager, the containerized applications utilize the configuration settings made available via the host operating system. Accordingly, the host operating system acts as a proxy to manage the containerized applications on behalf of the mobile device manager. By having the host operating system act as a proxy, the mobile device manager is not required to have any knowledge of each of the containerized applications and is relieved from the burden of individually managing each of the containerized applications executing on the computing device, as the mobile device manager is not required to provide configuration settings to the computing device each time a new containerized application is launched. This advantageously reduces the network traffic between the computing device and the mobile device manager, thereby freeing up network bandwidth for the enterprise network. Moreover, a lesser amount of computing resources (e.g., processing power, memory, power, etc.) of both the mobile device manager and the computing device are utilized. For instance, the mobile device manger is not required to provide numerous configuration settings at different times for each instance of a containerized application, and the computing device is not required to provide numerous requests for configuration setting requests for each containerized application executed thereon. Still further, the computing device is not required to provide results of applying the configuration settings each time they are applied to the host operating system or a particular containerized application. Instead, the computing device provides a merged version of the results to the mobile device manager.

The reduction in network transactions between the computing device and the mobile device manager advantageously decrease the configuration time for computing devices, thereby enabling a user to begin utilizing their device more quickly.

FIG. 1 is a block diagram of a system 100 for managing and configuring one or more computing devices in accordance with an example embodiment. As shown in FIG. 1, system 100 includes a server 102 and one or more computing devices 104 that are communicatively coupled via a network 106. Network 106 may comprise one or more networks such as local area networks (LANs), wide area networks (WANs), enterprise networks, the Internet, etc., and may include one or more of wired and/or wireless portions. As used herein, the term "enterprise" broadly refers to any of a wide variety of organization types, including businesses, non-profit organizations, and government agencies. An enterprise network comprises a private computer network established by an enterprise for the purposes of interconnecting enterprise devices (e.g., computing device (s) 104) at one or more enterprise locations to other enterprise devices and to enable enterprise devices to access and/or share computing resources. Users of computing device(s) 104 may be referred to herein as "enterprise users" or simply "users". Each of computing device(s) 104 may comprise, for example and without limitation, a desktop computer, a laptop computer, a tablet computer, a netbook, a smartphone, or the like. Additional examples of computing device(s) 104 are described below with reference to FIGS. 7 and 8.

Server 102 may be configured to manage each of computing device(s) 104 with respect to a policy (e.g., a data and/or security policy). The policy may be specified by an enterprise. Server 102 may also be referred to as a mobile device manager (MDM). The policy may be specified in accordance with one or more compliance rule(s). For instance, server 102 may comprise a compliance engine 108. Compliance engine 108 may determine configuration settings 110 to be provided to a particular computing device of computing device(s) 104 and provide the determined configuration(s) thereto. The determined configuration settings may comply with the compliance rule(s). The compliance rule(s) may be specified by an administrator of the enterprise (e.g., an IT administrator or other person within an enterprise who may be responsible for deploying, maintaining and/or configuring computing device(s) 104 on behalf of enterprise users). Configuration settings 110 may be maintained by server 102 (as shown in FIG. 1) or may be stored in a data store (not shown) communicatively coupled to server 102.

Configuration settings 110 may specify one or more configuration settings for a particular computing device of computing device(s) 104 and/or a particular user of each of computing device(s) 104. Thus, each of computing device(s) 104 may be associated with more than one of configuration settings 110. For example, a first configuration of configuration settings 110 may be associated with a first user of a particular computing device, and a second configuration of configuration settings 110 may be associated with a second user of the particular computing device. Examples of configuration settings 110 include, but are not limited to, one or more encryption settings to be implemented by computing device(s) 104, one or more security settings to be implemented by computing device(s) 104, one or more network settings to be implemented by computing device(s) 104, one or more application behavioral settings that affect that behavior of an application executing on computing device 104 (e.g., containerized application 114), a minimum version of at least one of an application or an operating system required to be installed on computing device(s) 104, etc. The encryption setting(s) may specify whether a storage device included in computing device 104 is to be encrypted (e.g., via an encryption program, such as, but not limited to BitLocker™). The security setting(s) may specify a password policy to be implemented by computing device 104 (e.g., setting the password length to a minimum of 10 characters, 12 characters, etc.), whether code signing should be implemented by computing device(s) 104, whether a trusted platform module (TPM) should be implemented by computing device(s) 104, whether an anti-malware application is to be installed and/or activated on computing device(s) 104, whether a firewall application is to be installed and/or activated on computing device(s), etc. The network setting(s) may specify network proxy settings to be implemented by computing device(s) 104, network quality-of-service (QoS) settings to be implemented by computing device(s) 104, network isolation settings to be implemented by computing device(s) 104, etc. It is noted that the configuration settings described above are purely exemplary and that other configuration settings may be used.

Configuration settings 110 may have any suitable form. In accordance with an embodiment, configuration settings 110 may be represented by an Extensible Markup Language (XML) file including a payload associated with configuration settings 110 and a corresponding Uniform Resource Identifier (URI) for downloading and processing of the payload.

Each of computing device(s) 104 is configured to execute a host operating system 112. Host operating system 112 is configured to launch applications via containers (shown as containerized applications 114). A container is a standard unit of executable software that packages program code of an application and all its dependencies necessary for application execution so that the application runs quickly and reliably from one computing environment to another. Examples of containers include, but are not limited to, MSIX containers (for running MSIX applications), Universal Windows Platform (UWP) containers (for running UWP applications), and Win32 containers (for running Win32 applications). By running applications via containers, the security and performance of the computing device on which containerized applications 114 execute is improved. Each of the containers may be executed separately as a guest operating system that is secondary to host operating system 112. Each guest operating system may have its own kernel, registry and drivers.

Host operating system 112 is configured to receive configuration settings 110 from server 102. Host operating system 112 determines the configuration settings from configuration settings 110 that are applicable thereto and configures itself accordingly. Host operating system 112 further makes configuration settings 110 available to containerized applications 114. Instead of obtaining configuration settings 114 directly from server 102, containerized applications 114 utilize configuration settings 110 made available via host operating system 112 and determines the configuration settings therefrom that are applicable thereto and configures itself accordingly. Accordingly, host operating system 112 acts as a proxy to manage containerized applications 114 on behalf of server 102.

By having host operating system 112 act as a proxy, server 102 is relieved from the burden of individually managing each of containerized applications 114. Thus, server 102 is not required to have any knowledge of containerized applications 114 and provide configuration settings to computing devices 104 each time a new containerized application is launched. Instead, whenever a containerized application is launched, the containerized application obtains its configuration settings via host operating system 112. This advantageously reduces the network traffic between computing device(s) 104 and server 102 and the load experienced by computing device(s) 104 and server 102.

After configuration settings 110 are applied by host operating system 112 and containerized applications 114, computing devices(s) 104 provide a response to server 102 that indicates that the results of applying the configuration settings thereon. For instance, the results may indicate whether the application of configuration settings 114 was successful or failed. Upon receiving the response with results specifying that each of configuration settings 110 were successfully applied from a particular computing device of computing device(s) 104, compliance engine 108 designates the computing device from which the response was received as being in compliance with the compliance rule(s), and the computing device enabled to access resources of network 106.

Upon receiving a response with results specifying that one or more of the configuration settings were not successfully applied, compliance engine 108 may determine that the particular computing device is not in compliance and/or prevent such computing device(s) from accessing a resource accessible via network 160. Such resources include, but are not limited to an email server, a data repository, an application server, etc. Access to such resources may be prevented until computing device(s) 104 are in compliance.

Figure 2:
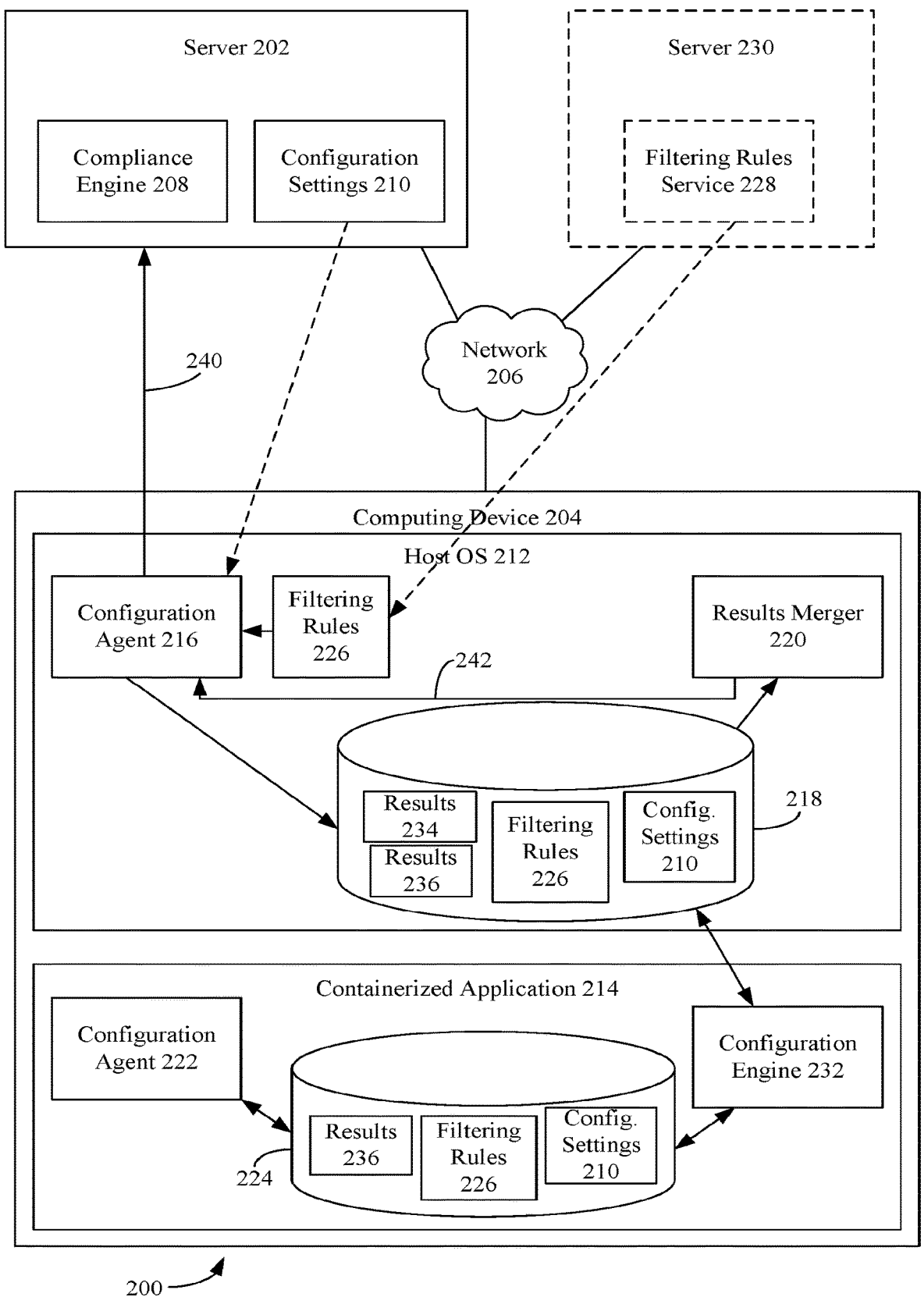
FIG. 2 depicts a block diagram of a system for managing and configuring one or more computing devices, that is a further detailed example of the system of FIG. 1, in accordance with an example embodiment.

System 100 of FIG. 1 may be implemented in various ways, in embodiments. For instance, FIG. 2 depicts a detailed block diagram of system 200, according to an example embodiment. System 200 is an example of system 100. As shown in FIG. 2, system 200 includes server 202 and a computing device 204 that are communicatively coupled via a network 206. Server 202, computing device 204, and network 206 are examples of server 102, computing device 104, and network 106, as respectively described above with reference to FIG. 1. As also shown in FIG. 2, server 202 comprises compliance engine 208 and configuration settings 210, which are examples of compliance engine 108 and configuration settings 110, as respectively described above with reference to FIG. 1. Computing device 204 comprises a host operating system 212 and a containerized application 214, which are examples of host operating system 112 and containerized application 114, as described above with reference to FIG. 1.

Host operating system 212 comprises a configuration agent 216, a local data store 218, and a results merger 220. Configuration agent 216 is configured to receive configuration settings 210 from server 202 via network 206. In accordance with an embodiment, the provision of configuration settings 210 by server 210 is initiated by configuration agent 216. For example, configuration agent 216 may query (or "check-in" with) server 202 to determine whether server 202 comprises configuration settings 210 that are to be applied to computing device 204. Configuration agent 216 may query server 202 on a periodic basis. However, the embodiments described herein are not so limited. For instance, configuration agent 216 may query server 202 responsive to a command from a user. In accordance with another embodiment, the provision of configuration settings 210 by server 210 is initiated by server 202. For example, compliance engine 208 may determine that new configuration settings are to be provided to computing device 204 and provide (or "push") such settings to configuration agent 216.

After receiving configuration settings 210, configuration agent 216 determines one or more settings of configuration settings 210 that are applicable to host operating system 212 and applies them to the appropriate operating system components (e.g., kernel, registry, drivers, etc.) and/or applications of host operating system 212. For instance, configuration agent 216 may apply one or more filtering rules 226 to determine whether particular settings of configuration settings 210 are applicable to host operating system 212. Each filtering rule may comprise an indication as to whether a particular configuration setting of configuration settings 210 is to be applied to host operating system 212, containerized application 214, or both host operating system 212 and containerized application 214. For example, a rule may comprise an identifier of an anti-virus application (e.g., Windows® Defender, published by Microsoft® Corporation of Redmond Washington) and an indication as to whether the anti-virus application is to be configured for host operating system 212, containerized application 214, or both host operating system 212 and containerized application 214. In accordance with an embodiment, the indication may comprise a value, where the value of '1' specifies that the anti-virus application is to be configured for host operating system 212, a value of '2' specifies that the anti-virus application is to be configured to for containerized application 214, and a value of '3' specifies that the anti-virus application is to be configured for both host operating system 212 and containerized application 214. Configuration agent 216 analyzes the indication of each filtering rule to determine whether the corresponding configuration setting of configuration settings 210 is to be applied to host operating system 212.

In accordance with an embodiment, filtering rules 226 may be provided by and/or subsequently updated by a filtering rules service 228. Filtering rules service 228 may execute on a server 230 communicatively coupled to computing device 204 via network 206, as shown in FIG. 2. Alternatively, filtering rules service 228 may execute on server 202. Filtering rules service 228 may be configured to periodically provide updated filtering rules to computing device 204. This advantageously provides the flexibility with regards to configuring computing device 204, as configuration requirements for computing device 204 may change over time. An example of filtering rules service 228 includes, but is not limited to, Microsoft® OneSettings, published by Microsoft® Corporation of Redmond, Washington.

Configuration agent 216 stores configuration settings 210 and filtering rules 226 in local data store 218 maintained by host operating system 212. Configuration agent 216 also stores the results (shown as results 234) of applying the applicable configuration settings of configuration settings 210 in local data store 218. For instance, results 234 may indicate whether the application of each of the applicable settings of configuration settings 210 were successful or failed.

Local data store 218 is integrated as part of computing device 204. Local data store 218 may be any type of physical memory and/or storage device (or portion thereof) that is described herein, and/or as would be understood by a person of skill in the relevant art(s) having the benefit of this disclosure. Local data store 218 is be made accessible to containerized application 214.

Containerized application 214 comprises a configuration agent 222, a configuration engine 232, and a local data store 224. When a containerized application 214 is instantiated (or launched) by host operating system 212, configuration engine 232 retrieves configuration settings 210 and filtering rules 226 from local data store 218 and stores configuration settings 210 and filtering rules 226 in local data store 224 maintained by containerized application 214. Local data store 224 is integrated as part of computing device 204. Local data store 224 may be any type of physical memory and/or storage device (or portion thereof) that is described herein, and/or as would be understood by a person of skill in the relevant art(s) having the benefit of this disclosure Configuration agent 222 is configured to retrieve configuration settings 210 and filtering rules 226 from local data store 224. Configuration agent 222 determines one or more settings of configuration settings 210 that are applicable to containerized application 214 and applies them to the appropriate guest operating system components (e.g., kernel, registry, drivers, etc.) of containerized application 214. For instance, configuration agent 222 may apply filtering rule(s) 226 to determine whether particular settings of configuration settings 210 are applicable to containerized application 214. Each filtering rule may comprise an indication as to whether a particular configuration setting of configuration settings 210 is to be applied to host operating system 212, containerized application 214, or both host operating system 212 and containerized application 214. Configuration agent 222 analyzes the indication of each filtering rule to determine whether the corresponding configuration setting of configuration settings 210 is to be applied to containerized application 214.

Configuration agent 222 also stores the results (shown as results 236) of applying the applicable configuration settings of configuration settings 210 in local data store 224. For instance, results 236 may indicate whether the application of each of the applicable settings of configuration settings 210 were successful or failed.

Configuration engine 232 is configured to retrieve results 236 from local data store 224 and store results 236 in local data store 218. Results merger 220 is configured to retrieve results 234 and results 236 from local data store 218. Results merger 220 merges results 234 and results 236 to generate merged results 242 and provides merged results 242 to configuration agent 216. Configuration agent 216 provides merged results 242 to server 202 via a response 240.

If response 240 comprises results specifying that configuration settings 210 were successfully applied on computing device 204, compliance engine 208 designates computing device 208 as being in compliance, and computing device 204 is enabled to access resources of network 206.

If response 240 comprises results specifying that one or more of the configuration settings were not successfully applied, compliance engine 210 may determine that the computing device 204 is not in compliance and/or prevent computing device 204 from accessing resource(s) accessible via network 206. Based on the results, compliance engine 210 may also provide additional configuration settings to computing device 204 that are to be applied by host operating system 212 and/or containerized application 214. For instance, the results may indicate that a particular configuration setting was not applied to computing device 204 due to an incompatibly between the configuration setting and computing device 204. In response, compliance engine 210 may provide an alternate configuration setting to computing device 204.

In accordance with an embodiment, containerized application 214 may initiate a request for configuration settings. As server 202 is unaware of containerized application 214, host operating system 212 provides (or forwards) the request on behalf of containerized application 214. For example, configuration agent 222 may provide a request specifying the requested configuration settings to configuration agent 216 of host operating 212, and configuration agent 216 forwards the request to server 202. Responsive to receiving the request, compliance engine 208 provides the requested configuration settings to configuration agent 216. Configuration agent 216 stores the configuration results in local data store 218. Configuration engine 232 of containerized application 214 retrieves the configuration settings from local data store 218 and stores the configuration settings in local data store 224 of containerized application 214. Configuration agent 222 retrieves the configuration settings and applies them to containerized application 214. Additional details regarding containerized application requests for configuration settings are described below with reference to FIGS. 5 and 6.

Figure 3:
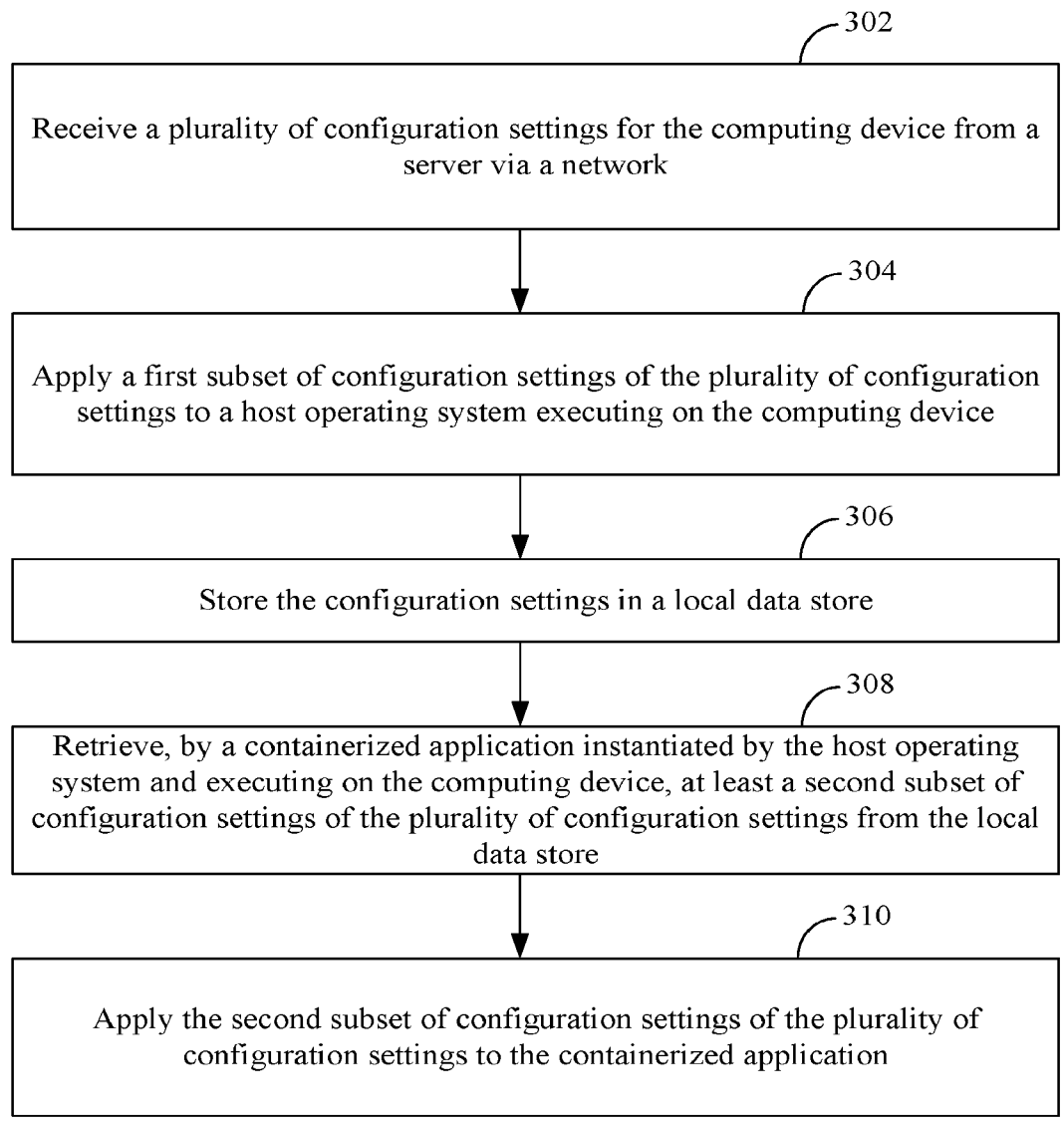
FIG. 3 depicts a flowchart of an example method implemented by a computing device for configuring a host operating system and a containerized application executing thereon in accordance with an example embodiment.

Accordingly, computing devices may be managed and configured in many ways. For example, FIG. 3 depicts a flowchart 300 of an example method implemented by a computing device for configuring a host operating system and a containerized application executing thereon in accordance with an example embodiment. The method of flowchart 300 will be described with continued reference to system 200 of FIG. 2, although the method is not limited to that implementation. Other structural and operational embodiments will be apparent to persons skilled in the relevant art(s) based on the discussion regarding flowchart 300 and system 200 of FIG. 2.

As shown in FIG. 3, the method of flowchart 300 begins at step 302, in which a plurality of configuration settings for the computing device are received from a server. For example, with reference to FIG. 2, configuration agent 216 of host operating system 212 executing on computing device 204 receives configuration settings 210 from server 202 via network 206. Server 202 may be a mobile device manager.

At step 304, a first subset of configuration settings of the plurality of configuration settings are applied to a host operating system executing on the computing device. For example, with reference to FIG. 2, configuration agent 216 of host operating system 212 applies configuration settings 210 to host operating system 212.

In accordance with one or more embodiments, a first filtering rule is applied to the plurality of configuration settings to determine the first subset of configuration settings. The first subset of configuration settings is applicable to the first operating system. For example, with reference to FIG. 2, configuration agent 216 applies filtering rules 226 to configuration settings 210 to determine a subset of configuration settings 210 that are applicable to host operating system 212. Local data store 218 stores filtering rules 226.

At step 306, the configuration settings are stored in a local data store. For example, with reference to FIG. 2, configuration agent 216 stores configuration settings 210 in local data store 218.

At step 308, a containerized application instantiated by host operating system and executing on the computing device retrieves at least a second subset of configuration settings of the plurality of configuration settings from the local data store. For example, with reference to FIG. 2, configuration engine 232 of containerized application 214 retrieves configuration settings 210 from local data store 218 and stores configuration settings 210 in local data store 224. Configuration engine 232 may retrieve all of configuration settings 210. Alternatively, configuration engine 232 may retrieve and filtering rules 226 and utilize filtering rules 232 to retrieve a subset of configuration settings of configuration settings 210 that are applicable to containerized application 214.

At step 310, the second subset of configuration settings of the plurality of configuration settings are applied to the containerized application. For example, with reference to FIG. 2, configuration agent 222 of containerized application 214 retrieves configuration settings 210 from local data store 224 and applies the second subset of configuration settings 210 to containerized application 214.

In accordance with one or more embodiments, the plurality of configuration settings comprises at least one of a security setting to be implemented for the computing device, a network setting to be implemented for the computing device, an encryption setting to be implemented for the computing device, or an application behavioral setting to be implemented for the containerized application.

In accordance with one or more embodiments, a second filtering rule is applied to the plurality of configuration settings to determine the second subset of configuration settings. The second subset of configuration settings is applicable to the containerized application. For example, with reference to FIG. 2, configuration engine 232 retrieves filtering rules 226 from local data store 218. Configuration agent 222 retrieves filtering rules 226 and applies filtering rules 226 to configuration settings 210 to determine a subset of configuration settings 210 that are applicable to containerized application 214.

In accordance with one or more embodiment, the first filtering rule and the second filtering rule are received by the host operating system via the network from a filtering rules service. For example, with reference to FIG. 2, filtering rules 226 are received by host operating system 212 via network 206 from filtering rules service 228 executing on server 230.

Figure 4:
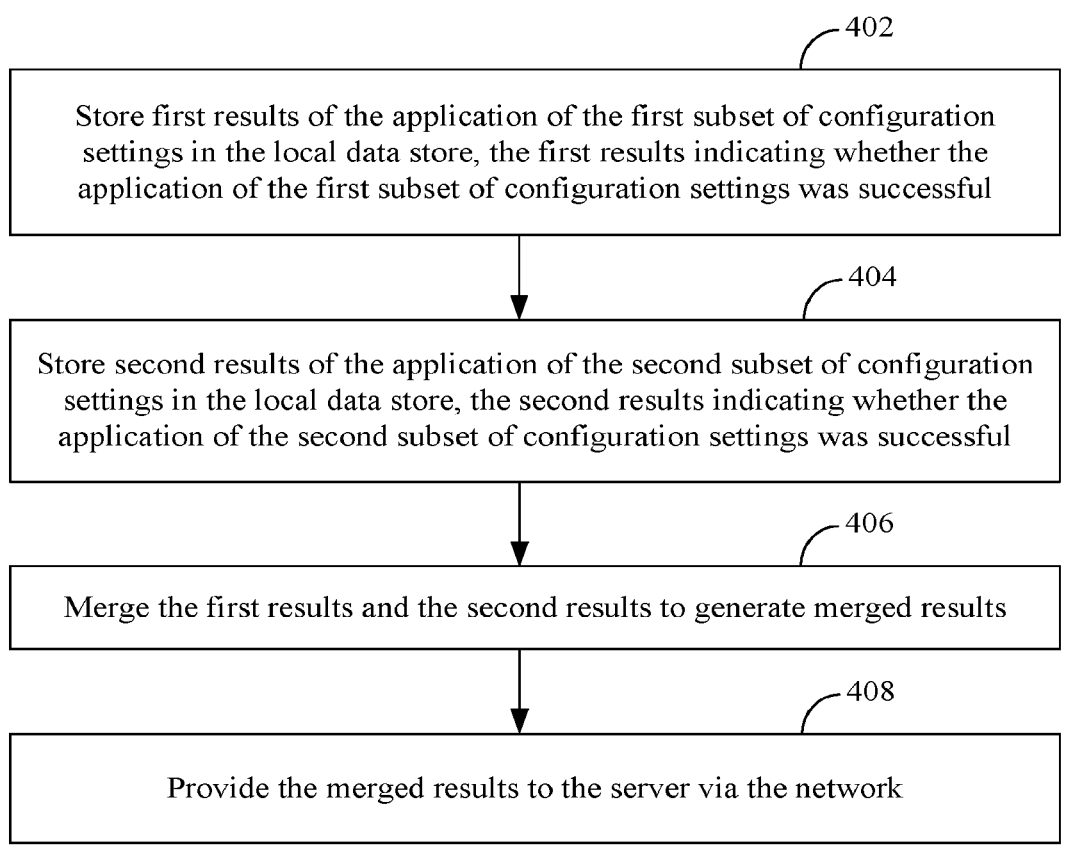
FIG. 4 depicts a flowchart of an example method for returning results of the application of configuration settings on a computing device in accordance with an example embodiment.

FIG. 4 depicts a flowchart 400 of an example method for returning results of the application of configuration settings on a computing device in accordance with an example embodiment. The method of flowchart 400 will be described with continued reference to system 200 of FIG. 2, although the method is not limited to that implementation. Other structural and operational embodiments will be apparent to persons skilled in the relevant art(s) based on the discussion regarding flowchart 400 and system 200 of FIG. 2.

As shown in FIG. 4, the method of flowchart 400 begins at step 402, in which first results of the application of the first subset of configuration settings are stored in the local data store. The first results indicate whether the application of the first subset of configuration settings was successful. For example, with reference to FIG. 2, configuration agent 216 stores results 234 of the application of the first subset of configuration settings 210 in local data store 218.

At step 404, second results of the application of the second subset of configuration settings are stored in the local data store. The second results indicate whether the application of the second subset of configuration settings was successful. For example, with reference to FIG. 2, configuration agent 222 of containerized application 214 stores results 236 of the application of the second subset of configuration settings 210 in local data store 224. Configuration engine 232 retrieves results 236 from local data store 224 and stores results 236 in local data store 218.

At step 406, the first results and the second results are merged to generate merged results. For example, with reference to FIG. 2, results merger 220 retrieves results 234 and results 236 from local data store 218 and merges results 234 and results 236 to generate merged results 242.

At step 408, the merged results are provided to the server via the network. For example, with reference to FIG. 2, results merger 220 provides merged results 242 to configuration agent 216, and configuration agent 216 provides merged results 242 via network 206 to server 202 via response 240.

In accordance with one or more embodiments, additional configuration settings are received from the server via the network based on the merged results. For example, with reference to FIG. 2, based on merged results 242, server 202 may determine additional configuration settings for computing device 204 and provide them to computing device 204 via network 206. Computing device 204 may apply the additional configuration settings in accordance with flowchart 300, as described above.

Figure 5:
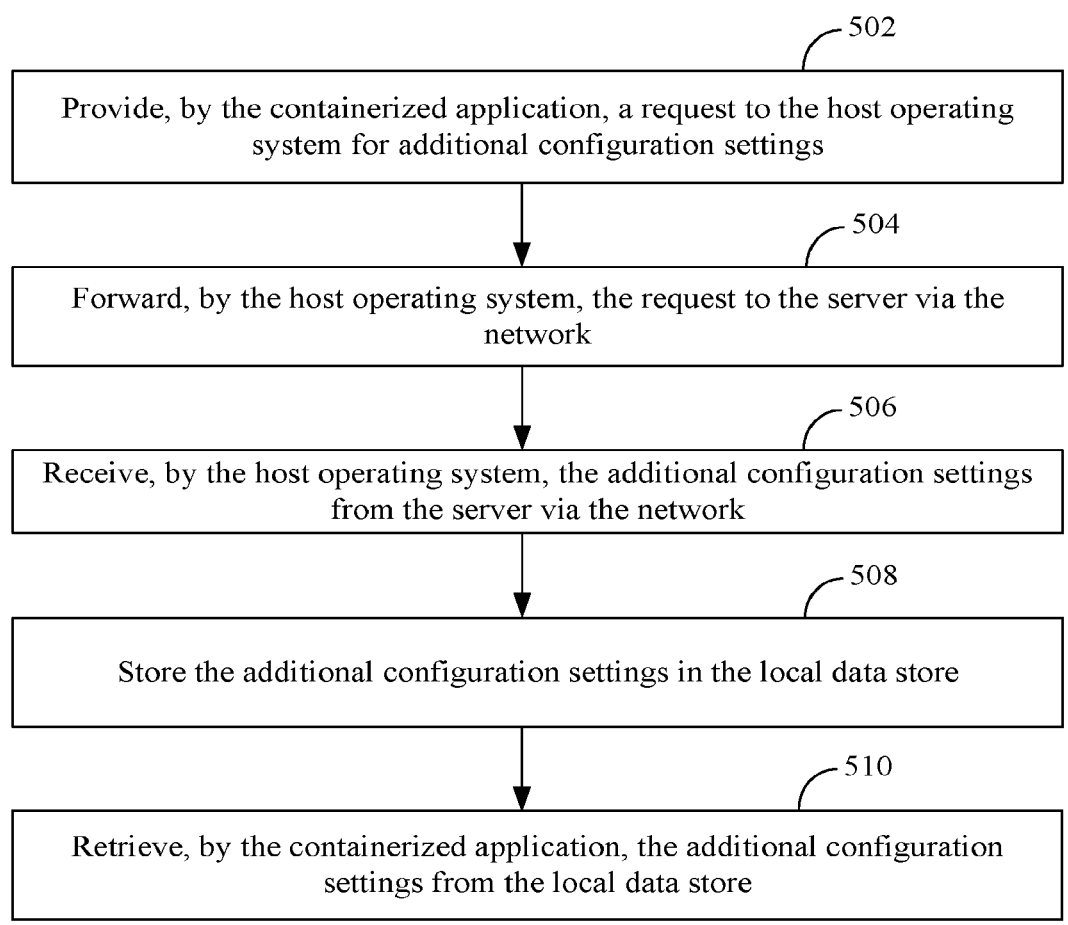
FIG. 5 depicts a flowchart of an example method for providing a request for configuration settings from a containerized application to a mobile device manager in accordance with an example embodiment.
Figure 6:
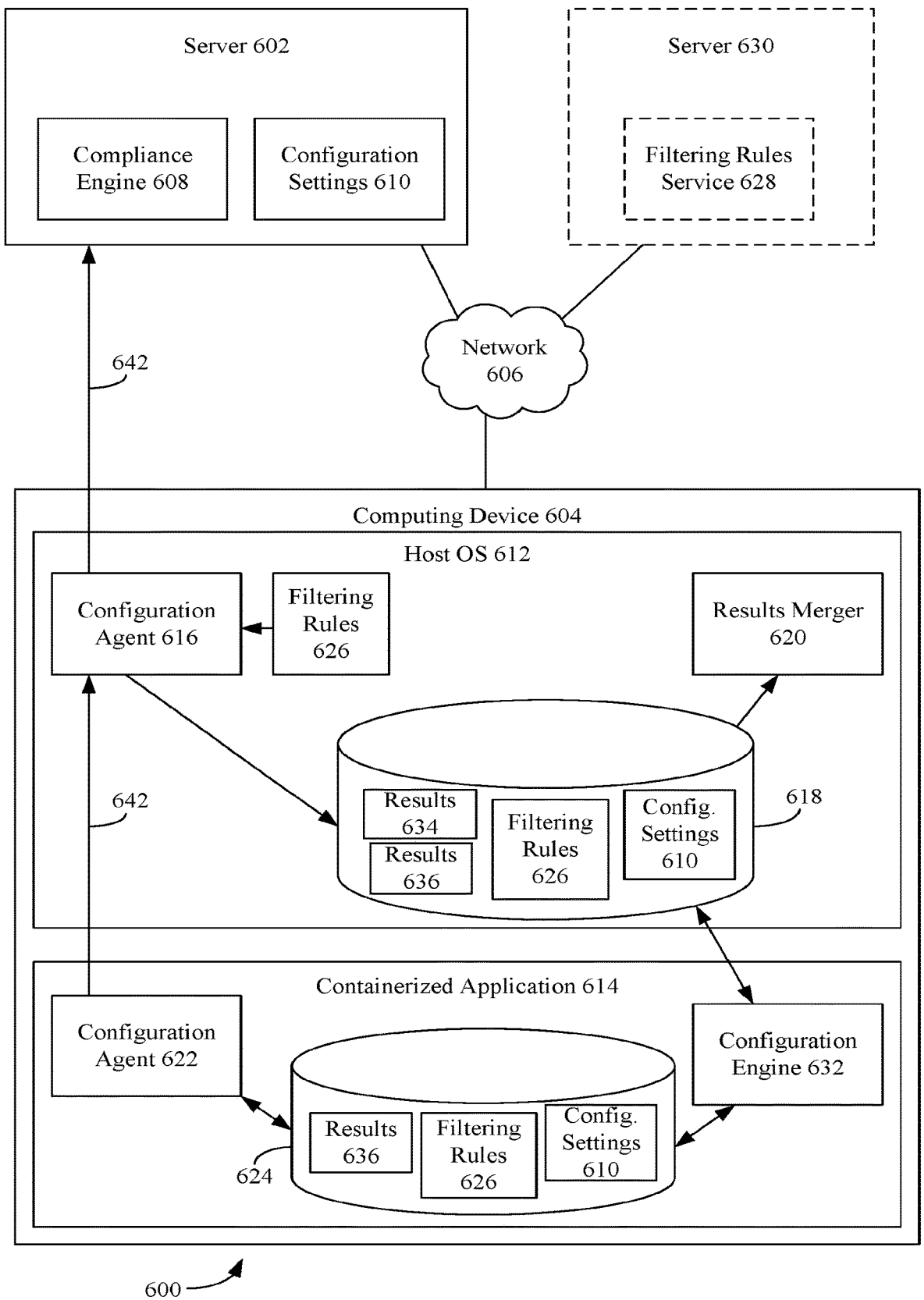
FIG. 6 depicts a block diagram of a system for determining whether a computing device remains in compliance with compliance rule(s) in accordance with an embodiment.

FIG. 5 depicts a flowchart 500 of an example method for providing a request for configuration settings from a containerized application to a mobile device manager in accordance with an example embodiment. The method of flowchart 500 will now be described with reference to FIG. 6, although flowchart 500 is not limited to the implementation depicted therein. FIG. 6 is a block diagram of a system 600 for configuring a computing device for compliance in accordance with an example embodiment. As shown in FIG. 6, system 600 comprises a server 602, a server 630, and a computing device 604 communicatively coupled via a network 606. Server 602, server 630, computing device 604, and network 606 are examples of server 202, server 230, computing device 204, and network 206, as described above with reference to FIG. 2. Server 602 comprises compliance engine 608 and configuration settings 610, which are examples of compliance engine 208 and configuration settings 210, as described above with reference to FIG. 2. Server 630 comprises a filtering rules service 628, which is an example of filtering rules service 228, as described above with reference to FIG. 2. Computing device 604 comprises a host operating system 612 and a containerized application 614, which are examples of host operating system 212 and containerized application 214, as described above with reference to FIG. 2. Host operating system 612 comprises a configuration agent 616, filtering rules 626, a results merger 620, and a local data store 616, which are examples of configuration agent 216, filtering rules 226, results merger 220, and local data store 618. Local data store 618 stores configuration settings 610, filtering rules 626, results 634, and results 636. Results 634 and results 636 are examples of results 234 and results 236, as described above with reference to FIG. 2. Containerized application 614 comprises a configuration agent 622, a configuration engine 632, and a local data store 624, which are examples of configuration agent 222, configuration engine 232, and local data store 224, as described above with reference to FIG. 2. Local data store 624 stores configuration settings 610, filtering rules 626, and results 636. Other structural and operational embodiments will be apparent to persons skilled in the relevant art(s) based on the discussion regarding flowchart 500 and system 600 of FIG. 6.

As shown in FIG. 5, the method of flowchart 500 begins at step 502, in which a request for additional configuration settings is provided by the containerized application and to the host operating system. For example, with reference to FIG. 6, configuration agent 222 of containerized application may provide a request 642 for additional configuration settings to configuration agent 216 of host operating system 212.

At step 504, the request is forward by the host operating system to the server via the network. For example, with reference to FIG. 6, configuration agent 616 forwards request 642 to server 602 via network 606.

At step 506, the additional configuration settings are received by the host operating system from the server via the network. For example, with reference to FIG. 6, configuration agent 216 receives the additional configuration settings (e.g., configuration settings 610) from server 602 via network 606.

At step 508, the additional configuration settings are stored in the local data store. For example, with reference to FIG. 6, configuration agent 216 stores the additional configuration settings in local data store 618.

At step 510, the containerized application retrieves the additional configuration settings from the local data store. For example, with reference to FIG. 6, configuration engine 632 retrieves the additional configuration settings (e.g., configuration settings 610) from local data store 618 and stores the settings in local data store 624. Configuration agent 622 retrieves the settings from local data store 624 and applies the settings to containerized application 214.

III. Example Mobile and Stationary Device Embodiments

The systems and methods described above, including the device management and configuration embodiments described in reference to FIGS. 1-6, may be implemented in hardware, or hardware combined with one or both of software and/or firmware. For example, server 102, compliance engine 108, computing device(s) 104, host operating system 112, containerized applications 114, server 202, compliance engine 208, computing device 204, host operating system 212, containerized application 214, configuration agent 216, local data store 218, results merger 220, configuration agent 222, local data store 224, configuration engine 232, server 602, compliance engine 608, computing device 604, host operating system 612, containerized application 614, configuration agent 616, local data store 618, results merger 620, configuration agent 622, local data store 624, configuration engine 632 and/or each of the components described therein, and flowchart 300, 400, and/or flowchart 500 be each implemented as computer program code/instructions configured to be executed in one or more processors and stored in a computer readable storage medium. Alternatively, server 102, compliance engine 108, computing device(s) 104, host operating system 112, containerized applications 114, server 202, compliance engine 208, computing device 204, host operating system 212, containerized application 214, configuration agent 216, local data store 218, results merger 220, configuration agent 222, local data store 224, configuration engine 232, server 602, compliance engine 608, computing device 604, host operating system 612, containerized application 614, configuration agent 616, local data store 618, results merger 620, configuration agent 622, local data store 624, configuration engine 632 and/or each of the components described therein, and flowchart 300, 400, and/or flowchart 500 may be implemented as hardware logic/electrical circuitry. In an embodiment, server 102, compliance engine 108, computing device(s) 104, host operating system 112, containerized applications 114, server 202, compliance engine 208, computing device 204, host operating system 212, containerized application 214, configuration agent 216, local data store 218, results merger 220, configuration agent 222, local data store 224, configuration engine 232, server 602, compliance engine 608, computing device 604, host operating system 612, containerized application 614, configuration agent 616, local data store 618, results merger 620, configuration agent 622, local data store 624, configuration engine 632 and/or each of the components described therein, and flowchart 300, 400, and/or flowchart 500 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
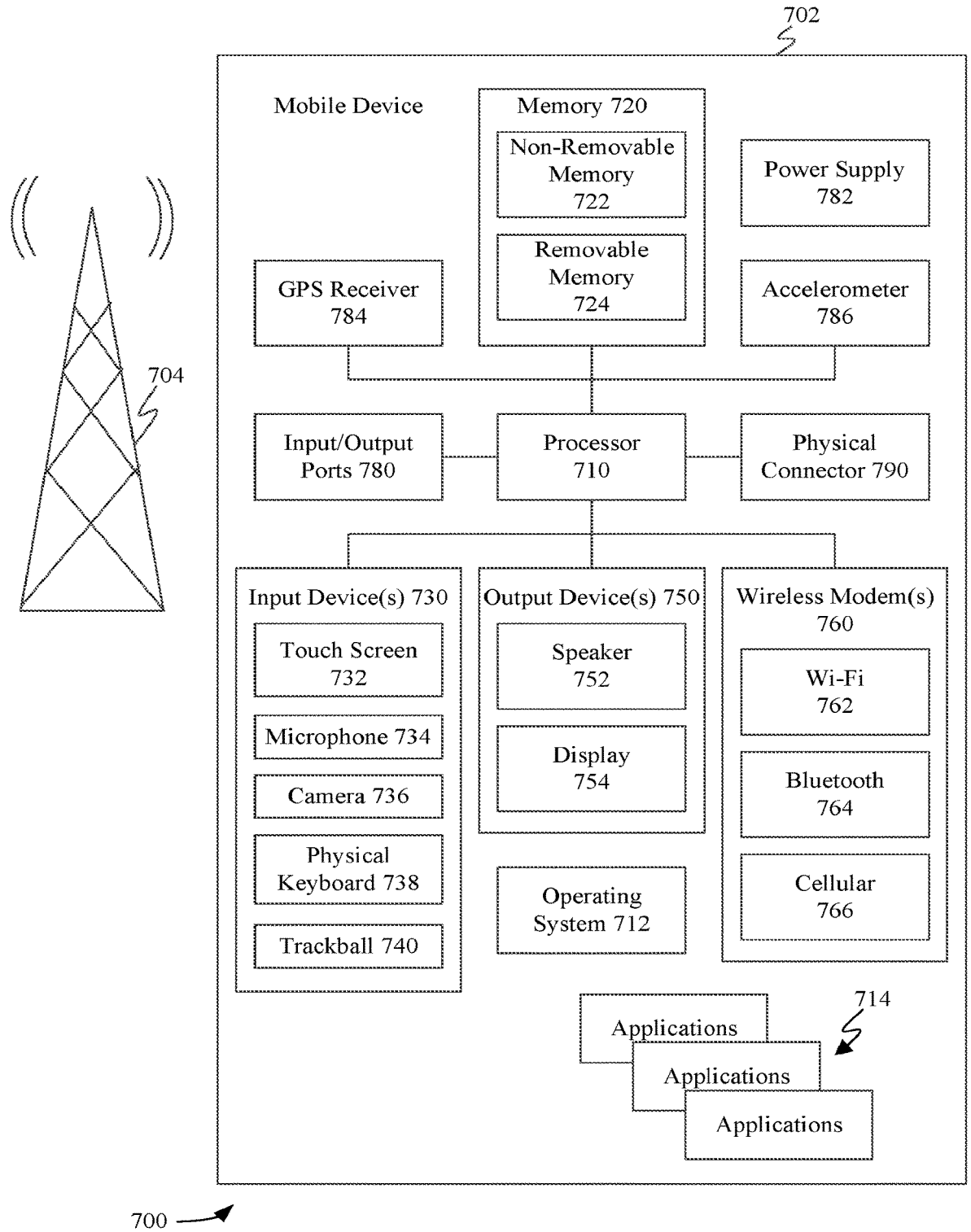
FIG. 7 is a block diagram of an exemplary user device in which embodiments may be implemented.

FIG. 7 shows a block diagram of an exemplary mobile device 700 including a variety of optional hardware and software components, shown generally as components 702. Any number and combination of the features/elements of server 102, compliance engine 108, computing device(s) 104, host operating system 112, containerized applications 114, server 202, compliance engine 208, computing device 204, host operating system 212, containerized application 214, configuration agent 216, local data store 218, results merger 220, configuration agent 222, local data store 224, configuration engine 232, server 602, compliance engine 608, computing device 604, host operating system 612, containerized application 614, configuration agent 616, local data store 618, results merger 620, configuration agent 622, local data store 624, configuration engine 632 and/or each of the components described therein, and flowchart 300, 400, and/or flowchart 500 may be implemented as components 702 included in a mobile device embodiment, as well as additional and/or alternative features/elements, as would be known to persons skilled in the relevant art(s). It is noted that any of components 702 can communicate with any other of components 702, although not all connections are shown, for ease of illustration. Mobile device 700 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 704, such as a cellular or satellite network, or with a local area or wide area network.

The illustrated mobile device 700 can include a controller or processor referred to as processor circuit 710 for performing such tasks as signal coding, image processing, data processing, input/output processing, power control, and/or other functions. Processor circuit 710 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 710 may execute program code stored in a computer readable medium, such as program code of one or more applications 714, operating system 712, any program code stored in memory 720, etc. Operating system 712 can control the allocation and usage of the components 702 and support for one or more application programs 714 (a.k.a. applications, "apps", etc.). Application programs 714 can include common mobile computing applications (e.g., email applications, calendars, contact managers, web browsers, messaging applications) and any other computing applications (e.g., word processing applications, mapping applications, media player applications).

As illustrated, mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running operating system 712 and applications 714. Example data can include web pages, text, images, sound files, video data, or other data sets to be sent to and/or received from one or more network servers or other devices via one or more wired or wireless networks. Memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 720. These programs include operating system 712, one or more application programs 714, and other program modules and program data. Examples of such application programs or program modules may include, for example, computer program logic (e.g., computer program code or instructions) for implementing the systems described above, including the device compliance management embodiments described in reference to FIGS. 1-6.

Mobile device 700 can support one or more input devices 730, such as a touch screen 732, microphone 734, camera 736, physical keyboard 738 and/or trackball 740 and one or more output devices 750, such as a speaker 752 and a display 754.

Other possible output devices (not shown) can include piezoelectric or other haptic output devices. Some devices can serve more than one input/output function. For example, touch screen 732 and display 754 can be combined in a single input/output device. The input devices 730 can include a Natural User Interface (NUI).

Wireless modem(s) 760 can be coupled to antenna(s) (not shown) and can support two-way communications between processor circuit 710 and external devices, as is well understood in the art. The modem(s) 760 are shown generically and can include a cellular modem 766 for communicating with the mobile communication network 704 and/or other radio-based modems (e.g., Bluetooth 764 and/or Wi-Fi 762). Cellular modem 766 may be configured to enable phone calls (and optionally transmit data) according to any suitable communication standard or technology, such as GSM, 3G, 4G, 5G, etc. At least one of the wireless modem(s) 760 is typically configured for communication with one or more cellular networks, such as a GSM network for data and voice communications within a single cellular network, between cellular networks, or between the mobile device and a public switched telephone network (PSTN).

Mobile device 700 can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be not present and other components can be additionally present as would be recognized by one skilled in the art.

Figure 8:
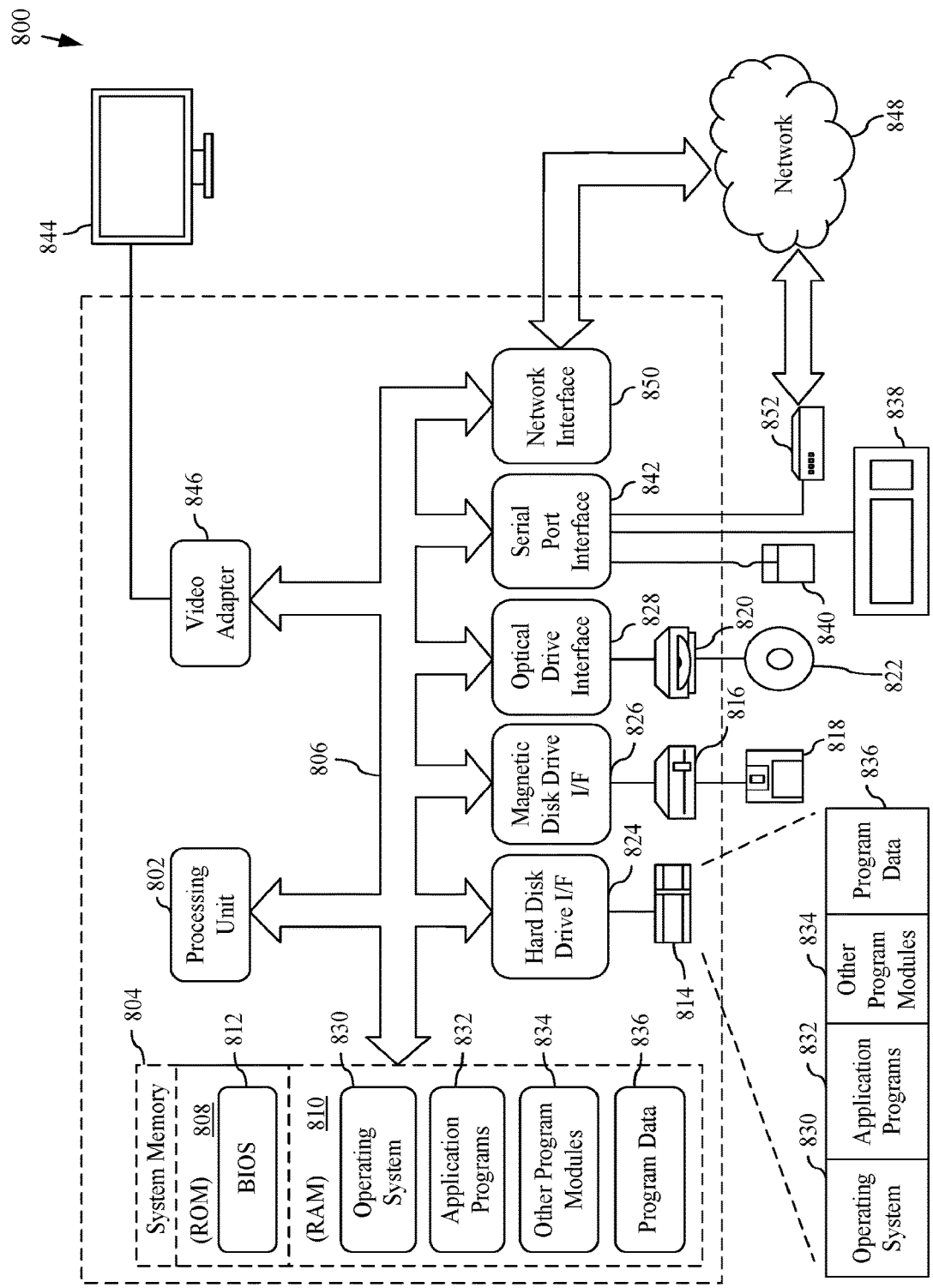
FIG. 8 is a block diagram of an example computing device that may be used to implement embodiments.

Furthermore, FIG. 8 depicts an exemplary implementation of a computing device 800 in which embodiments may be implemented, including server 102, compliance engine 108, computing device(s) 104, host operating system 112, containerized applications 114, server 202, compliance engine 208, computing device 204, host operating system 212, containerized application 214, configuration agent 216, local data store 218, results merger 220, configuration agent 222, local data store 224, configuration engine 232, server 602, compliance engine 608, computing device 604, host operating system 612, containerized application 614, configuration agent 616, local data store 618, results merger 620, configuration agent 622, local data store 624, configuration engine 632 and/or each of the components described therein, and flowchart 300, 400, and/or flowchart 500. The description of computing device 800 provided herein is provided for purposes of illustration, and is not intended to be limiting. Embodiments may be implemented in further types of computer systems, as would be known to persons skilled in the relevant art(s).

As shown in FIG. 8, computing device 800 includes one or more processors, referred to as processor circuit 802, a system memory 804, and a bus 806 that couples various system components including system memory 804 to processor circuit 802. Processor circuit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computing device 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 830, one or more application programs 832, other programs 834, and program data 836. Application programs 832 or other programs 834 may include, for example, computer program logic (e.g., computer program code or instructions) for implementing the systems described above, including the device management and configuration embodiments described in reference to FIGS. 1-6.

A user may enter commands and information into the computing device 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in computing device 800. Display screen 844 may display information, as well as being a user interface for receiving user commands and/or other information (e.g., by touch, finger gestures, virtual keyboard, etc.). In addition to display screen 844, computing device 800 may include other peripheral output devices (not shown) such as speakers and printers.

Computing device 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to generally refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nanotechnology-based storage devices, and further types of physical/tangible hardware storage media (including system memory 804 of FIG. 8). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 852, or any other interface type. Such computer programs, when executed or loaded by an application, enable computing device 800 to implement features of embodiments discussed herein. Accordingly, such computer programs represent controllers of the computing device 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A method implemented by a computing device is described herein. The method includes: receiving a plurality of configuration settings for the computing device from a server via a network; applying a first subset of configuration settings of the plurality of configuration settings to a host operating system executing on the computing device; storing the configuration settings in a local data store; retrieving, by a containerized application instantiated by the host operating system and executing on the computing device, at least a second subset of configurations of the plurality of configuration settings from the local data store; and applying the second subset of configuration settings of the plurality of configuration settings to the containerized application.

In an embodiment of the method, the method further comprises: applying a first filtering rule to the plurality of configuration settings to determine the first subset of configuration settings, the first subset of configuration settings being applicable to the host operating system; and applying a second filtering rule to the plurality of configuration settings to determine the second subset of configuration settings, the second subset of configuration settings being applicable to the containerized application.

In an embodiment of the method, wherein the first filtering rule and the second filtering rule are received by the host operating system via the network from a filtering rules service.

In an embodiment of the method, the method further comprises: providing, by the containerized application, a request to the host operating system for additional configuration settings; forwarding, by the host operating system, the request to the server via the network; receiving, by the host operating system, the additional configuration settings from the server via the network; storing the additional configuration settings in the local data store; and retrieving, by the containerized application, the additional configuration settings from the local data store.

In an embodiment of the method, the method further comprises: storing first results of the application of the first subset of configuration settings in the local data store, the first results indicating whether the application of the first subset of configuration settings was successful; storing second results of the application of the second subset of configuration settings in the local data store, the second results indicating whether the application of the second subset of configuration settings was successful; merging the first results and the second results to generate merged results; and providing the merged results to the server via the network.

In an embodiment of the method, the method further comprises: receiving additional configuration settings from the server via the network based on the merged results.

In an embodiment of the method, the plurality of configuration settings comprises at least one of: a security setting to be implemented for the computing device; a network setting to be implemented for the computing device; an encryption setting to be implemented for the computing device; or an application behavioral setting to be implemented for the containerized application.

A computing device is also described herein. The computing device includes at least one processor circuit and at least one memory that stores program code configured to be executed by the at least one processor circuit, the program code comprising: a first configuration agent of a host operating system installed on the computing device, the first configuration agent configured to: receive a plurality of configuration settings for the computing device from a server via a network; apply a first subset of configuration settings of the plurality of configuration settings to the host operating system executing on the computing device; and store the configuration settings in a local data store; and a second configuration agent of a containerized application instantiated by the host operating system, the second configuration agent configured to: retrieve at least a second subset of configuration settings of the plurality of configuration settings; and apply the second subset of configuration settings of the plurality of configuration settings to the containerized application.

In an embodiment of the computing device, the first configuration agent is configured to: apply a first filtering rule to the plurality of configuration settings to determine the first subset of configuration settings, the first subset of configuration settings being applicable to the host operating system; and the second configuration agent is configured to: apply a second filtering rule to the plurality of configuration settings to determine the second subset of configuration settings, the second subset of configuration settings being applicable to the containerized application.

In an embodiment of the computing device, the host operating system is configured to receive the first filtering rule and the second filtering rule via the network from a filtering rules service.

In an embodiment of the computing device, the second configuration agent is further configured to: provide a request to the host operating system for additional configuration settings; and the first configuration agent is further configured to: forward the request to the server via the network; receive the additional configuration settings from the server via the network; and store the additional configuration settings in the local data store, the second configuration agent being further configured to apply the additional configuration settings to the containerized application.

In an embodiment of the computing device, the first configuration agent is further configured to: store first results of the application of the first subset of configuration settings in the local data store, the first results indicating whether the application of the first subset of configuration settings was successful; the second configuration agent is further configured to: store second results of the application of the second subset of configuration settings in the local data store, the second results indicating whether the application of the second subset of configuration settings was successful; and the program code further comprises: a results merger configured to: merge the first results and the second results to generate merged results; and provide the merged results to the first configuration agent, the first configuration agent being further configured to prove the merged results to the server via the network.

In an embodiment of the computing device, the first configuration agent is further configured to: receive additional configuration settings from the server via the network based on the merged results.

In an embodiment of the computing device, the plurality of configuration settings comprises at least one of: a security setting to be implemented for the computing device; a network setting to be implemented for the computing device; an encryption setting to be implemented for the computing device; or an application behavioral setting to be implemented for the containerized application.

A computer-readable storage medium having program instructions recorded thereon that, when executed by at least one processor, perform a method is further described herein. The method includes receiving a plurality of configuration settings for the computing device from a server via a network; applying a first subset of configuration settings of the plurality of configuration settings to a host operating system executing on the computing device; storing the configuration settings in a local data store; retrieving, by a containerized application instantiated by the host operating system and executing on the computing device, at least a second subset of configuration settings of the plurality of configuration settings from the local data store; and applying the second subset of configuration settings of the plurality of configuration settings to the containerized application.

In an embodiment of the computer-readable storage medium, the method further comprises: applying a first filtering rule to the plurality of configuration settings to determine the first subset of configuration settings, the first subset of configuration settings being applicable to the host operating system; and applying a second filtering rule to the plurality of configuration settings to determine the second subset of configuration settings, the second subset of configuration settings being applicable to the containerized application.

In an embodiment of the computer-readable storage medium, the first filtering rule and the second filtering rule are received by the host operating system via the network from a filtering rules service.

In an embodiment of the computer-readable storage medium, the method further comprises: providing, by the containerized application, a request to the host operating system for additional configuration settings; forwarding, by the host operating system, the request to the server via the network; receiving, by the host operating system, the additional configuration settings from the server via the network; storing the additional configuration settings in the local data store; and retrieving, by the containerized application, the additional configuration settings from the local data store.

In an embodiment of the computer-readable storage medium, the method further comprises: storing first results of the application of the first subset of configuration settings in the local data store, the first results indicating whether the application of the first subset of configuration settings was successful; storing second results of the application of the second subset of configuration settings in the local data store, the second results indicating whether the application of the second subset of configuration settings was successful; merging the first results and the second results to generate merged results; and providing the merged results to the server via the network.

In an embodiment of the computer-readable storage medium, the method further comprises: receiving additional configuration settings from the server via the network based on the merged results.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method comprising:
   prior to instantiating a containerized application:
      receiving, by a host operating system, a plurality of configuration settings from a mobile device manager, the plurality of configuration settings including first configuration settings to be applied to the host operating system and second configuration settings to be applied to a containerized application, the first configuration settings being different from the second configuration settings; and
      storing the plurality of configuration settings in a local data store of the host operating system, the local data store of the host operating system comprising a first filtering rule for determining the first configuration settings are to be applied to the host operating system;
   instantiating, by the host operating system, the containerized application;
   accessing, by the containerized application, the plurality of configuration settings in response to instantiating the containerized application;
   identifying, by the host operating system, the first configuration settings by applying the first filtering rule to the plurality of configuration settings;
   applying, by the host operating system, the first configuration settings to the host operating system;
   identifying, by the containerized application, the second configuration settings by applying a second filtering rule to the plurality of configuration settings, the second filtering rule being stored in the local data store of the containerized application; and
   applying, by the containerized application, the second configuration settings to the containerized application.

2. The method of claim 1, wherein the plurality of configuration settings comprises at least one of:
   a security setting to be applied to the host operating system;
   a network setting to be applied to the host operating system;
   an encryption setting to be applied to the host operating system; or
   an application behavioral setting to be applied to the containerized application.

3. The method of claim 1, wherein the first filtering rule and the second filtering rule are received by the host operating system from a filtering rules.

4. A device comprising:
   a processing unit; and
   a memory coupled to the processing unit and storing instructions that, when executed, perform operations comprising:
      prior to instantiating a containerized application:
         receiving, by a host operating system, a plurality of configuration settings from a mobile device manager, the plurality of configuration settings including first configuration settings to be applied to the host operating system and second configuration settings to be applied to a containerized application, the first configuration settings being different from the second configuration settings; and storing the plurality of configuration settings in a local data store of the host operating system, the local data store of the host operating system comprising a first filtering rule for determining the first configuration settings are to be applied to the host operating system;

instantiating, by the host operating system, the containerized application;

accessing, by the containerized application, the plurality of configuration settings in response to instantiating the containerized application;

identifying, by the containerized application, the second configuration settings based on a second filtering rule stored in the containerized application;

applying, by the containerized application, the second configuration settings to the containerized application; and storing, by the containerized application, results of applying the first configuration settings to the containerized application.

5. The device of claim 4, wherein the results indicate whether the containerized application satisfies one or more compliance rules specified by the mobile device manager.

6. The device of claim 5, wherein, when the results indicate the containerized application does not satisfy the one or more compliance rules, the device is prevented from accessing one or more resources.

7. The device of claim 5, wherein, when the results indicate the containerized application does not satisfy the one or more compliance rules, the containerized application initiates a request for additional compliance rules.

8. The device of claim 7, the operations further comprising:

in response to initiating the request for the additional compliance rules, providing the results to the mobile device manager;

receiving the additional compliance rules; and applying the additional compliance rules to the containerized application.

9. The device of claim 4, wherein applying the second configuration settings to the containerized application causes the containerized application to comply with one or more security policies applicable to the device.

10. A system comprising:

a processing unit; and a memory coupled to the processing unit and storing instructions that, when executed, perform operations comprising:

prior to instantiating a containerized application:

receiving, by a host operating system, a plurality of configuration settings from a mobile device manager, the plurality of configuration settings including first configuration settings to be applied to the host operating system and second configuration settings to be applied to the containerized application, the first configuration settings being different from the second configuration settings; and storing the plurality of configuration settings in a local data store of the host operating system, the local data store of the host operating system comprising a first filtering rule for determining the first configuration settings are to be applied to the host operating system;

instantiating, by the host operating system, the containerized application;

accessing, by the containerized application, the plurality of configuration settings in response to instantiating the containerized application;

identifying, identifying, by the containerized application, the second configuration settings by applying a second filtering rule to the plurality of configuration settings, the second filtering rule being stored in a local data store of the containerized application; and applying, by the containerized application, the second configuration settings to the containerized application.

11. The system of claim 10, wherein the plurality of configuration settings comprises at least one of:

a security setting to be applied to the host operating system;

a network setting to be applied to the host operating system;

an encryption setting to be applied to the host operating system; or an application behavioral setting to be applied to the containerized application.

12. The system of claim 10, wherein the mobile device manager is separate from a computing device comprising the host operating system.

13. The system of claim 12, the operations further comprising:

determining the first configuration settings by applying the first filtering rule to the plurality of configuration settings; and applying the first configuration settings to the host operating system.

14. The system of claim 13, wherein the first filtering rule and the second filtering rule are received by the host operating system from a filtering rules service that is separate from the computing device.

15. The system of claim 13, the operations further comprising:

storing first results of applying the first configuration settings to the host operating system in the local data store of the host operating system; and storing second results of applying the second configuration settings to the containerized application in the local data store of the containerized application.

16. The system of claim 15, the operations further comprising:

generate generating merged results by merging the first results and the second results; and providing the merged results to the mobile device manager device.

17. The system of claim 16, the operations further comprising:

receiving, from the mobile device manager, additional configuration settings based on the merged results, the merged results indicating that a configuration setting was not applied to at least one of the containerized application or the host operating system.

18. The system of claim 10, wherein the first filtering rule comprises an indication that the first configuration settings are applicable to the containerized application and the host operating system.

19. The system of claim 10, wherein the first filtering rule is comprised by a plurality of filtering rules, each filtering rule of the plurality of filtering rules comprising an indication that the filtering rule is applicable to the containerized application, the host operating system, or both the containerized application and the host operating system.

20. The system of claim 19, wherein the plurality of filtering rules is provided to the host operating system as part of a periodic compliance update.

* * * * *